(12) United States Patent
Monk et al.

(10) Patent No.: US 8,018,342 B2
(45) Date of Patent: Sep. 13, 2011

(54) RADIO FREQUENCY SENSOR CIRCUITRY SENSING DEVICE

(75) Inventors: David James Monk, Rexford, NY (US); Radislav Alexandrovich Potyrailo, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 376 days.

(21) Appl. No.: 11/952,671

(22) Filed: Dec. 7, 2007

(65) Prior Publication Data

US 2009/0146810 A1    Jun. 11, 2009

(51) Int. Cl.
*G08B 13/14* (2006.01)

(52) U.S. Cl. ............ 340/572.1; 340/572.8; 340/539.26

(58) Field of Classification Search ............ 340/539.26, 340/539.1, 540, 541, 572.1, 572.7, 572.8, 340/572.5; 324/633

See application file for complete search history.

(56) References Cited

U.S. PATENT DOCUMENTS

| | | | |
|---|---|---|---|
| 6,897,827 | B2 | 5/2005 | Senba et al. |
| 7,064,668 | B2 | 6/2006 | Porad |
| 7,205,899 | B2 | 4/2007 | Surkau |
| 2006/0220866 | A1 | 10/2006 | Dixon et al. |
| 2006/0220867 | A1 | 10/2006 | Dixon et al. |
| 2006/0255945 | A1 | 11/2006 | Egbert |
| 2007/0040675 | A1* | 2/2007 | Rong et al. ............ 340/540 |
| 2007/0231614 | A1* | 10/2007 | Kondo et al. ............ 428/842.1 |
| 2008/0012577 | A1* | 1/2008 | Potyrailo et al. ............ 324/633 |
| 2008/0252450 | A1* | 10/2008 | Wandel ............ 340/541 |

FOREIGN PATENT DOCUMENTS

| | | |
|---|---|---|
| WO | 2006044168 A2 | 4/2006 |
| WO | 2006105007 A2 | 10/2006 |
| WO | WO2007139574 | 12/2007 |

OTHER PUBLICATIONS

PCT Search Report—Feb. 18, 2009.

* cited by examiner

*Primary Examiner* — Hung T. Nguyen
(74) *Attorney, Agent, or Firm* — Jenifer E. Haeckl

(57) ABSTRACT

A sensing device adapted to detect environmental changes and/or an analyte is provided. The sensing device comprising radio frequency sensor circuitry, a protection material disposed on the radio frequency sensor circuitry, and a metallic layer disposed on the protection material. A detection system for detecting an environmental change or an analyte in an article is provided.

17 Claims, 7 Drawing Sheets

RADIO FREQUENCY SENSOR CIRCUITRY SENSING DEVICE

BACKGROUND

The invention relates to devices for physical, chemical, radiological, or biological detection, and more particularly to radio frequency sensor circuitry based sensing devices for physical, chemical, radiological, or biological detection in the presence of metals.

Radio frequency identification (RFID) tags are widely employed for identification of animals, garments, consumer goods, combinatorial chemistry reaction products, and detection of unauthorized opening of containers. For such applications, the conventional passive RFID tags are preferred due to their low cost (less than $1). For sensing applications that involve detecting change in temperature, and pressure, traditional RFID tags require a specific redesign of portions of their electronic circuitry. Disadvantageously, such RFID sensors also often require a battery.

In free space, the electromagnetic field of the RFID tag is undisturbed. However, if the RFID tag is placed on or in a metallic surface (in proximity to metal), the magnetic flux through the metal substrate induces eddy currents within the metal that opposes the reader's magnetic field. This dampens the magnetic field in the metal to an extent that communication between the reader and transponder may no longer be possible. A similar issue of impaired readability exists with articles or products composed of water or liquid.

RFID systems have been recently applied for wireless sensing applications. For example, RFID-based temperature sensors, bacterial sensor RFID tags are employed in sensing applications. Similar to RFID tags, sensors based on RFID tags are also negatively affected in presence of metals or liquids. Accordingly, operation of passive RFID based sensors is conventionally prohibited in close proximity to metal surfaces (such as walls of metal containers, etc.).

Therefore, it would be desirable to provide a device that would enable a RFID based sensor to operate in metallic and/or liquid environments.

BRIEF DESCRIPTION

In one embodiment, a sensing device adapted to detect environmental changes and/or an analyte is provided. The sensing device comprising radio frequency sensor circuitry, a protection material disposed on the radio frequency sensor circuitry, and a metallic layer disposed on the protection material.

In another embodiment, a sensing device adapted for use in a metallic or a non-metallic environment is provided. The device comprising radio frequency sensor circuitry, an isolation surface for isolating the radio frequency sensor circuitry from the metallic environment, and a metallic surrounding for quenching predetermined signals from the radio frequency sensor circuitry.

In yet another embodiment, a sensing device for detecting an analyte in a fluid sample is provided. The device comprising radio frequency sensor circuitry, an isolation material disposed on the radio frequency sensor circuitry, and a metallic layer disposed on the isolation material, wherein the sensing device is at least partially disposed in the fluid sample.

In another embodiment, a radio frequency sensor circuitry based sensing device adapted for use in proximity to other equipment such that the electromagnetic signal from the sensing device does not cause interference to other equipment. The device comprising radio frequency sensor circuitry, a protection material disposed on the radio frequency sensor circuitry; and a metallic surface disposed adjacent to the protection film.

In another embodiment, a detection system for detecting an environmental change or an analyte in an article is provided. The system comprising a sensing device. The sensing device comprising radio frequency sensor circuitry, a protection material disposed on the radio frequency sensor circuitry; and a metallic layer disposed on the protection material.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
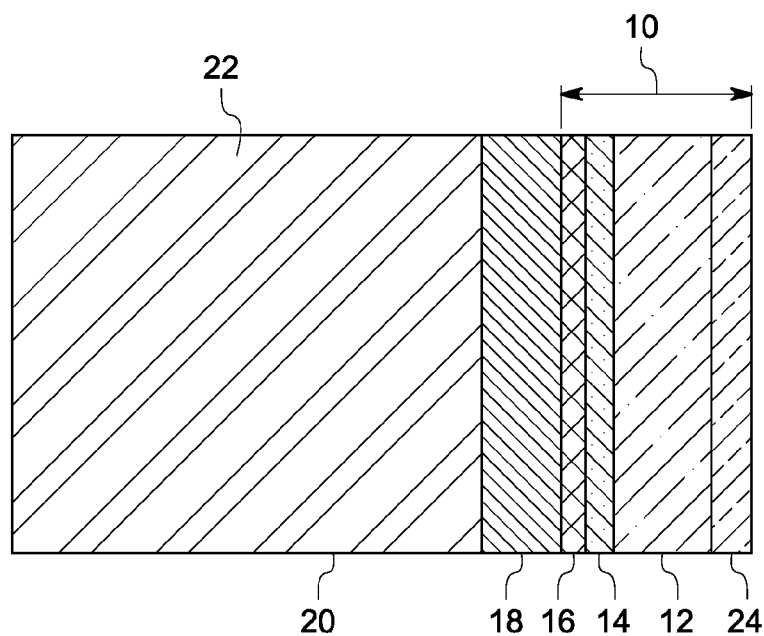
FIGS. 1-8 illustrates cross-sectional views of alternative embodiments of sensing devices of the present technique.

As will be described in detail below, sensing devices and systems for use in metallic and/or fluidic surroundings are provided. The sensing devices may be physical, chemical, radiological, and biological sensing devices. The sensing devices may detect, among many other characteristics and parameters, physical attributes (such as temperature, flow, pressure), chemical attributes (conductivity, pH), radiological attributes (such as radiation dose) and the presence and identify of a variety of biological materials, and characteristics of these biological materials. The sensing devices are adapted for use in surroundings that contain metal parts and/or liquids in close proximity to the sensing devices. For example, the sensing devices may be employed on the surface of a metallic vehicle, in a metallic air duct, in a pipeline, or in a disposable bioprocess manufacturing.

In certain embodiments, a multi-analyte chemical or biological identification using a radio frequency sensor circuitry based sensing device is provided. For example, the sensing device may comprise a conventional passive radio frequency identification (RFID) tag. In certain embodiments, a device and system to eliminate effects of the metal surfaces on the quenching of the radio frequency signal from the radio frequency sensor circuitry based physical, chemical, radiological, and biological sensing devices is provided. In certain embodiments, a thin layer of a passivating material (such as an inert polymer) is disposed on the surface of the sensing device. The passivating layer may be disposed on one or both sides of the radio frequency sensor circuitry As will be appreciated, the electromagnetic flux of the radio frequency sensor circuitry based devices is attenuated by the generation of eddy currents in a metal placed in close proximity to the device. In certain embodiments, a thin layer of a protection material (such as a ferrite material) is disposed between the sensing device and the metal surrounding. As a result, the electromagnetic flux that is employed to interrogate the sensing device is not attenuated by the metal surrounding, making it possible for these sensing devices to operate on metal surfaces. Such sensing devices may be employed in diverse applications, such as disposable biopharmaceutical manufacturing, homeland security, and other applications.

As used herein, the term "disposed on" encompasses, but is not limited to, arrangements where either the surfaces are in direct physical contact, or there are one or more layers present between the two surfaces. As used herein, the terms "fluid" or "fluidic" are used to describe a liquid, a gas, or a solid. As used herein, the term "sensing film" embodies any material or device that responds selectively to an analyte. As used herein, the term "metallic layer" is used to describe any metallic body that spreads over at least a portion of the radio frequency sensor circuitry of the sensing device.

As will be described with respect to FIGS. 1-8, the sensing device is adapted to detect environmental changes such as a temperature change, a pressure change, a conductivity change, a resistance change, a change in the amount of radioactive radiation, or an analyte in a fluid. The fluid may be disposed in a metallic or a non-metallic container. The sensing device includes radio frequency sensor circuitry, a protection material disposed on the radio frequency sensor circuitry and a metallic layer disposed on the protection material.

When employing the sensing device on a surface of a metallic container, the surface of the metallic container may act as the metallic layer of the sensing device. Hence, in these embodiments, the radio frequency sensor circuitry may have a protection material disposed there on, and the protection material may be in operative association with the metallic surface of the container. The metallic layer may be an outer surface or an inner surface of the container. When disposed on the outer surface of the container, the sensing device may be used to detect the changes outside the container. For example, the sensing device may be used to detect the change in temperature, pressure, or chemical/biological species outside the container. Alternatively, when the metallic layer is the inner surface of the container, that is, when the sensing device is disposed on the inner side of the container, the sensing device may be used to sense changes in the composition of a fluid present in the container. In embodiments where the sensing device is disposed on the inner surface of the container, the sensing device may be adapted such that the device does not responds to the changes in the solution conductivity of the fluid, but responds to the presence of one or more analytes in the fluid.

The radio frequency sensor circuitry may comprise one or more electrical components, such as, but is not limited to, an antenna, a transistor, a diode, a rectifier, a logic chip, a radio frequency identification chip, a capacitor, an integrated circuit, a memory chip, or any combination or multiple thereof. In one example, the capacitor is part of the memory chip. In one embodiment, the radio frequency sensor circuitry may also contain an integrated circuit with a programmable unique identification number as is used in RFID tags. In an example embodiment, the radio frequency sensor circuitry comprises a radio frequency antenna coupled to various additional circuitry components.

The metallic layer may diminish or at least partially terminate the electromagnetic field present around the sensing device. In addition, in some embodiments, the metallic layer is configured to act as a sensing film. For example, the metallic layer may be such that upon interaction with an analyte the metallic layer changes one or two detectable properties.

The metallic layer may include one or more of a solid metallic layer, a patterned metallic layer, a metallic mesh, or a porous metallic layer. The metallic layer may be selectively porous to permit the analytes pass through the bulk of the metallic layer. In one embodiment, the metallic layer may be in direct contact with the fluid, such as the liquid sample carrying the analyte.

The metallic layer may include either a single metal or a combination of metals. The metals in the metallic layer are highly conducting. In one embodiment, electrical conductivity of the metallic layer is at least about $1 \times 10^4$ S/cm. The metallic layer may include steel, stainless steel, copper, aluminum, silver, gold, platinum, titanium, and any other highly conducting metal and alloy. Further, the metallic layer may be made of a composite material. Alternatively, the metallic layer may include one or more semiconductor material. Non-limiting examples of the semiconductor material may include semiconducting oxide films, such as tin oxide, or zinc oxide. Further, the metallic layer may include organic analogs of metals such as conjugated polymers also known as conducting polymers. As will be appreciated, conjugated polymers are organic polymers with conjugated bonds between single monomers that have electrical, electronic, magnetic, and optical properties of metals, while preserving the processability and other properties of conventional polymers. Examples of conjugated polymers include polyparaphenylene, polyphenylenevinylene, polypyrrole, polyacetylene, polythiophene, polyfuran, polyheteroaromatic vinylenes, polyaniline, and numerous derivatives of these compounds.

In certain embodiments, the protection material or protection layer or isolation surface is made of a ferromagnetic type material. The layer(s) of the ferromagnetic materials prevent electromagnetic flux attenuation, thereby making it possible for these sensor devices to operate on metal surfaces. In one embodiment, the ferromagnetic material has a permeability greater than 1. The ferromagnetic material is selected from the group consisting of nickel, zinc ferrite, carbonyl iron, magnetite, iron silicide, iron alloy, and nickel alloy. The optimal thickness of the layer of the ferromagnetic material, in mils, is equal to 240 divided by the permeability of the material.

The sensing device may also include an adhesive layer for coupling the sensing device on a surface. The adhesive layer may be such that the sensing device may be temporarily coupled to a surface. For example, the sensing device may be coupled to the surface of a container during operation and subsequently, the sensing device may be removed from the container after the operation. The sensing device may be disposed and then peeled off multiple numbers of times. In one embodiment, the sensing device may be retrofitted on a device or a machine or a system for detection of environmental parameters or analytes. In one embodiment, the sensing device is embedded in a cavity formed in an article.

As discussed with regard to the embodiments illustrated in FIGS. 1-8, the protection material may be disposed at various locations in the sensing device. In one embodiment, the protection material is incorporated into the substrate of the radio frequency sensor circuitry. For example, the material of the substrate is co-mingled with the ferrite material, thus changes in the analyte concentration result in changes of the ferrite material properties. In another embodiment, the ferrite material is incorporated between the fluid sample and the radio frequency sensor circuitry to passivate the sensor device from changes in the dielectric constant of the solution. For example, the ferrite material is incorporated between the fluid and the radio frequency sensor circuitry to measure temperature without convoluted effects of the change in conductivity. In one embodiment, a metal layer is interposed between the fluid sample and the ferrite material on the surface of the radio frequency sensor circuitry to further passivate the sensor device from changes in the fluid.

Depending on the type of attribute that the sensing device needs to sense, the embodiments illustrated in FIGS. 1-8 may employ one or more passivating layers. The passivating layers may be disposed on one or both sides of the radio frequency sensor circuitry. In embodiments where the sensing device employs a sensing film, one of the passivating layers may be provided between the radio frequency sensor circuitry and the sensing film. In one embodiment, the sensing device may be employed inside or outside an empty container. In another embodiment, the sensing device may be employed inside or outside a container that is at least filled with a fluid, such as a liquid. In one example, the sensing device may be at least partially disposed in the fluid.

The various electrical components on the radio frequency sensor circuitry may respond to the environmental changes or to the analytes. For example, temperature or pressure changes in the environment results in change in the capacitance, resistance due to shrinking or cooling of the materials of the capacitors and resistors, this change in capacitance or resistance of the radio frequency sensor circuitry can be measured and mapped to the related change in temperature. Similarly, distortion in the material of the antenna may be linked to the environmental changes, such as temperature or pressure changes. By detecting the change in electromagnetic field of the sensor device, the environmental changes may be detected. RFID sensors placed on a metallic surface are normally subject to attenuation of the sensor's electromagnetic flux by the generation of eddy currents in the metal. The otherwise considered negative influence of a metal surroundings on a radio frequency sensor circuitry, is used to its advantage in the present devices. For example, the metallic layer in the sensing device may be used to quench the undesirable response from the sensing device. This way, the desirable response from the sensing device may be obtained, even in the cases where the desirable response may be relatively weaker than the undesirable response. For example, in a solution with fluctuating conductivity, the change in conductivity may be quenched by the use of a metallic layer in the sensing device. However, another parameter of the same solution, which is comparatively smaller in magnitude, such as a pH change, may be detected by the use of the sensing device.

Optionally, the sensing device may include one or more sensing films. The sensing films may be used to detect one or more analytes present in the fluid. For example, a sensing film adapted to detect pH of a sample is a hydrogen ion sensitive film. Similarly, a pressure sensitive film may be employed to detect the pressure in a sample. The sensing film may include one or more sensors. The sensors may be physical sensors for detecting a variety of parameters such as, but not limited to, the temperature, pressure, of the sample. Alternatively, the sensors may be chemical or biological sensors for detecting chemical or biological species, respectively. Suitable examples of sensing films for detection of radioactive radiation for an RFID radiological sensor are NiO, ZnO, $In_2O_3$, $CeO_2$, MgO, $TiO_2$, CuO, CdO, and other known films.

FIG. 1 is an example of a sensing device that may be used on an outer surface of a non-metallic container. The sensing device 10 is adapted to not respond to changes within the container, such as changes in the content composition. However, the sensor device 10 is adapted to respond to changes outside the container. The sensing device 10 includes radio frequency sensor circuitry 12, a protection layer 14 disposed on the radio frequency sensor circuitry 12, a metallic layer or metallic surrounding 16 disposed on the protection material or protection layer 14. The metallic layer 16 in turn is disposed on the outer side of a wall 18 of a container 20 having fluid 22. Although not illustrated, the sensing device 10 may be coupled to the wall 18 by an adhesive material. Optionally, a sensing film 24 may be disposed on the radio frequency sensor circuitry 12. The sensing film 24 may be chosen depending on the kind of analyte that needs to be detected. Also, depending on what the sensing device 10 would be sensing, another passivating layer 14 may be employed between the radio frequency sensor circuitry 12 and the sensing film 24.

Figure 2:
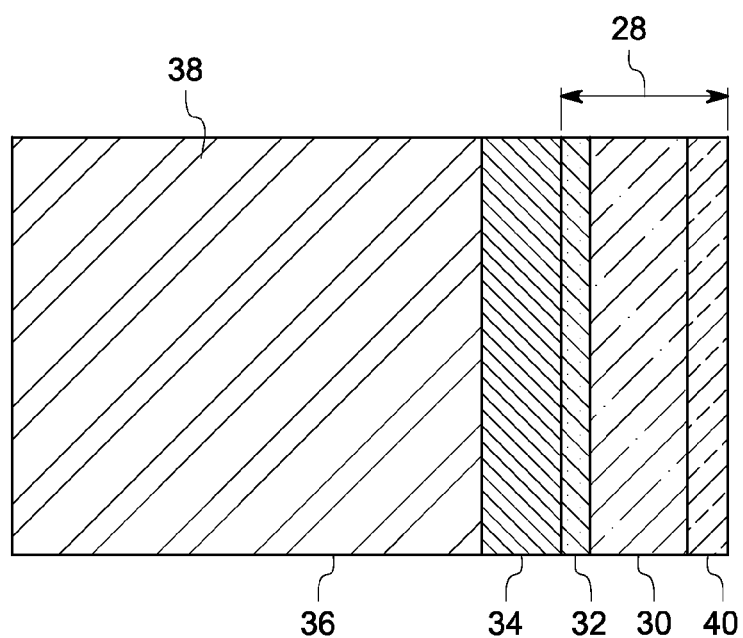

FIG. 2 illustrates a sensing device 28 having radio frequency sensor circuitry 30, a protection layer 32. The sensing device 28 is disposed on the outer wall 34 of a metallic container 36. In this embodiment, the wall 34, in part, acts as the metallic layer for the sensing device 28. The container 36 is filled with a fluid 38. The wall 34 of the metallic container 36 acts as the metallic layer for the sensing device 28. The sensing device 28 may further include a sensing film 40 disposed on the radio frequency sensor circuitry 30.

FIGS. 3-8 depict embodiments of sensing devices that may be used inside a metallic or a non-metallic container in a liquid environment, for example. In all these embodiments, the sensing device may include one or more passivating layers. The passivating layers may be disposed on one or both sides of the radio frequency sensor circuitry 30.

Figure 3:
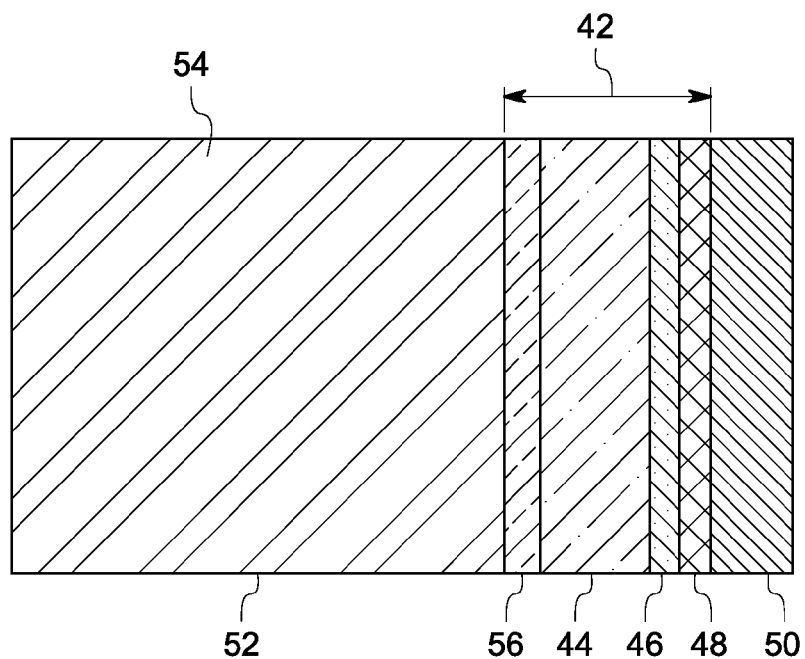

In the illustrated embodiment of FIG. 3, the sensing device 42 includes radio frequency sensor circuitry 44, a protection layer 46, and a metallic layer 48 disposed between the radio frequency sensor circuitry 44 and the outer wall 50 of the non-metallic container 52. The container 52 contains fluid 54, such as a liquid sample. Optionally, the sensing device 42 includes a sensing film 56. In the illustrated embodiment, the sensing film 56 is in direct contact with the fluid 54. The sensing device 42 is configured to respond to changes in the composition of the fluid 54 within the container 52.

Figure 4:
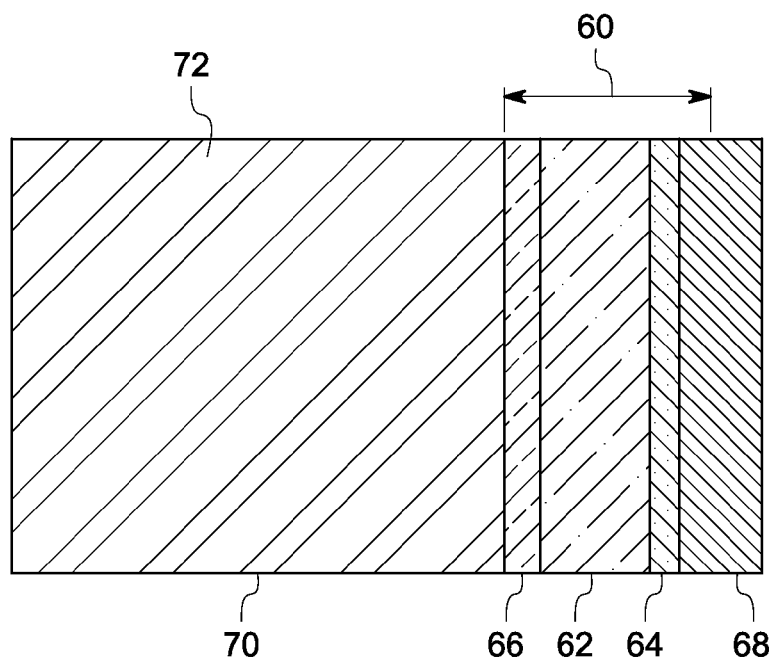

Turning now to FIG. 4, the sensing device 60 having radio frequency sensor circuitry 62, a protection layer 64 and an optional sensing film 66 is disposed on an inner wall 68 of a metallic container 70 having fluid 72. The wall 68 of the metallic container acts as the metallic layer for the sensing device 60. As with the embodiment illustrated in FIG. 3, the sensing film 66 is in direct contact with the fluid 72 present in the container 70.

FIGS. 5-8 illustrate embodiments where the sensing film is not in direct contact with the fluid.

Figure 5:
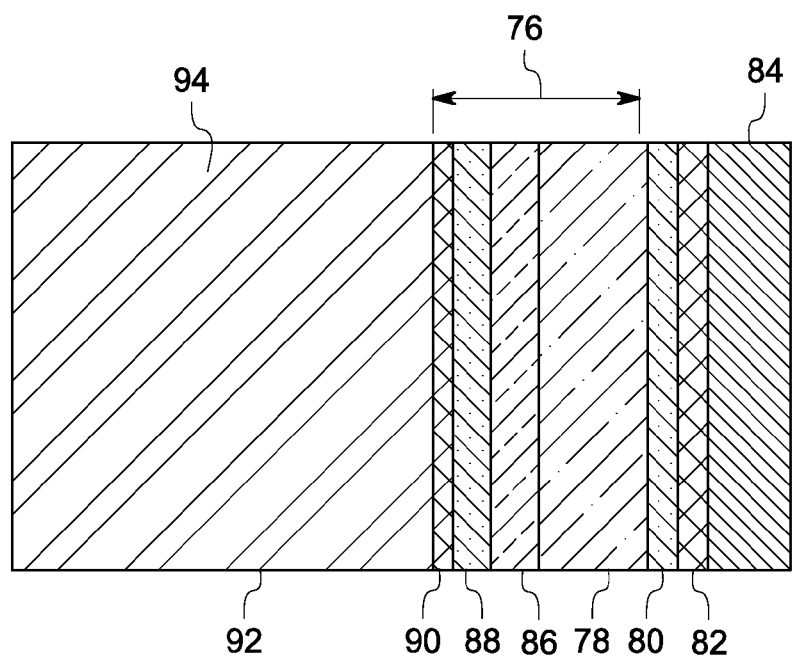

As illustrated in FIG. 5, the sensing device 76 may comprise more than one protection and metallic layers. The sensing device 76 includes a protection layer 80 and a metallic layer 82 disposed on the side of the radio frequency sensor circuitry 78, which is closer to the wall 84 of the container 92. Whereas, the sensing device 76 includes a protection layer 88 and a metallic layer 90 disposed on the other side of the radio frequency sensor circuitry 78. The device 76 may also optionally include a sensing film 86 disposed on the radio frequency sensor circuitry 78. In the illustrated embodiment, the sensing film 86 is not in direct contact with the fluid 94. The device 76 does not respond to changes in the bulk container. Further, the device 76 does not respond to changes outside the container. The device 76 is adapted to detect the analytes present in the fluid 94. The analytes pass through the metal layer 90 and the protection layer 88 to reach the sensing film 86.

Figure 6:
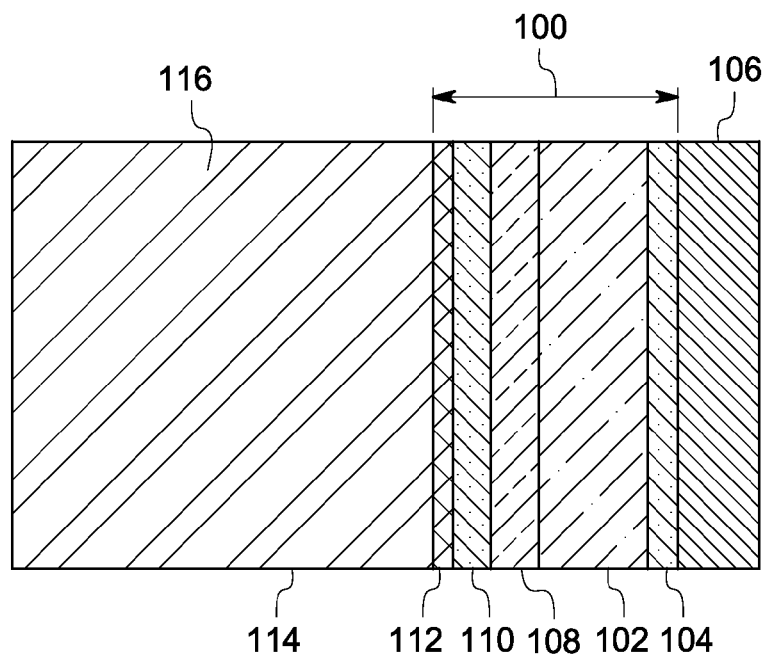

FIG. 6 illustrates a sensing device 100 having a radio frequency sensor circuitry 102, a protection layer 104 disposed on a container wall 106. The sensing device 100 also includes a sensing film 108, a front protection film or material 110, and a front metallic layer 112. The terms "front protection film" or and "front metallic layer" refer to the side of the radio frequency sensor circuitry, which is closer to the analyte. The front protection material and the protection material may either have same or different material. Similarly, the front metallic layer and the metallic layer may be made of either same or different materials. The container 114 is a metallic container having a fluid 116. The sensing device 100 is adapted to not respond to the changes in bulk container content composition, the changes outside the container. The sensing device 100 detects the analytes present in the fluid 116. The analytes pass through the front metallic layer 112 and the front protection film 110 to reach the sensing film 108.

Figure 7:
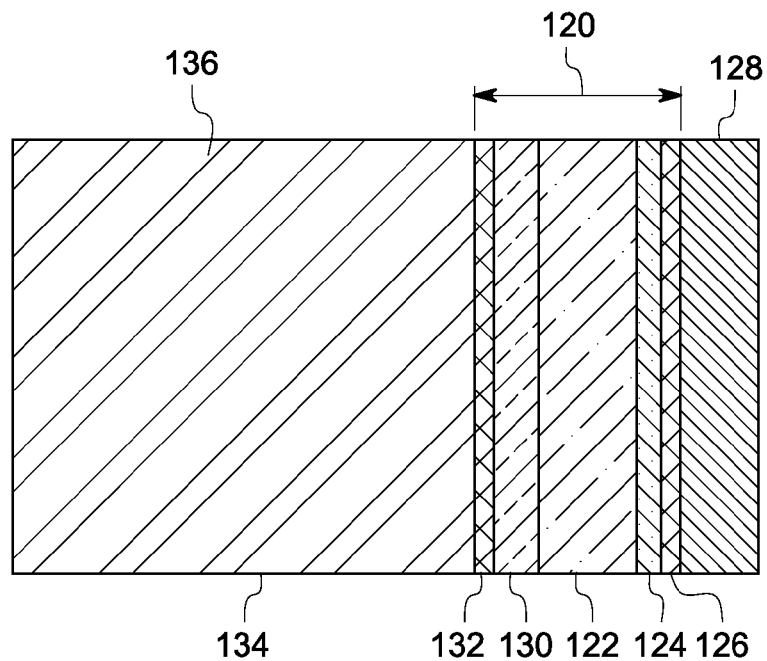

Referring to FIG. 7, the sensing device 120 includes radio frequency sensor circuitry 122. The radio frequency sensor circuitry 122 contains a protection layer 124, a metallic layer 126 which are disposed next to the wall 128 of the container 134 on one side of the radio frequency sensor circuitry 122. On the other side of the radio frequency sensor circuitry 122, a sensing film 130 is disposed. A metallic layer 132 is disposed on the sensing film 130. The metallic layer 132 may be a porous layer to allow analytes present in the fluid 136 to pass through and reach the sensing film 130.

Figure 8:
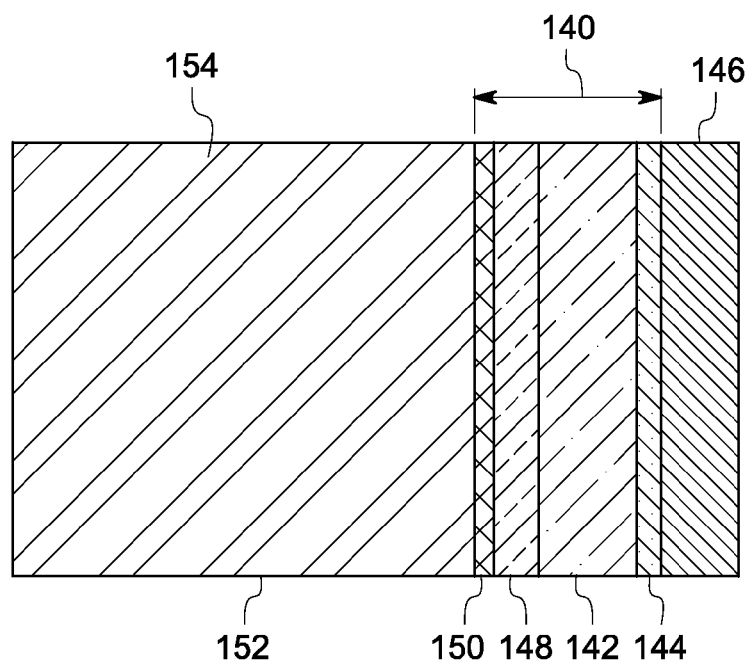

FIG. 8 illustrates a sensing device 140 for use on a metallic surface. The device 140 includes a radio frequency sensor circuitry 142, a protection layer 144 disposed adjacent to the wall 146 of the container 152. The sensing device 140 further includes a sensing film 148 and a metallic layer 150. The metallic layer 150 allows the analytes from the fluid 154 to reach the sensing film 148.

The sensing devices may be used in disposable components, manufactured for disposable bioprocesses such as pharmaceutical, biopharmaceutical manufacturing and other processes. The use of these sensing devices has a new functionality provided from embedding disposable radio frequency sensor circuitry based sensing devices into disposable components. These disposable components are from key operations in pharmaceutical production process and from other processes and include components such as bioreactors, mixers, product transfer lines, connectors, filters, chromatography columns and components, centrifuges, and others. Some embodiments may be used in conjunction for improved sensor operation, storage, and filling. For these diverse needs, disposable sensor systems are needed to enable the in-line manufacturing monitoring and control.

Example 1

Measurements of the complex impedance of RFID sensors were performed using a network analyzer (Agilent Technologies, Inc. Santa Clara, Calif.) under a computer control using LabVIEW. The analyzer was used to scan the frequencies over the range of interest (typically centered at 13 MHz with a scan range of ~10 MHz) and to collect the complex impedance response from the RFID sensor. A multichannel electronic signal multiplexer was built to operate with the analyzer for measurements of two or more RFID sensors at once. Temperature control was performed using Labjack U12 (National Instruments).

The collected complex impedance data was analyzed using Excel (MicroSoft Inc. Seattle, Wash.) or KaleidaGraph (Synergy Software, Reading, Pa.) and PLS_Toolbox (Eigenvector Research, Inc., Manson, Wash.) operated with Matlab (The Mathworks Inc., Natick, Mass.).

Digital ID readings from the memory micro-chips of RFID sensors were performed with several RFID readers that included a handheld SkyeTek reader, and a SkyeTek computer-controlled (using LabVIEW) reader, respectively (Model M-1, SkyeTek, Westminster, Colo.), and a computer-controlled multi-standard RFID Reader/Writer evaluation module (Model TRF7960 Evaluation Module, Texas Instruments).

Figure 9:
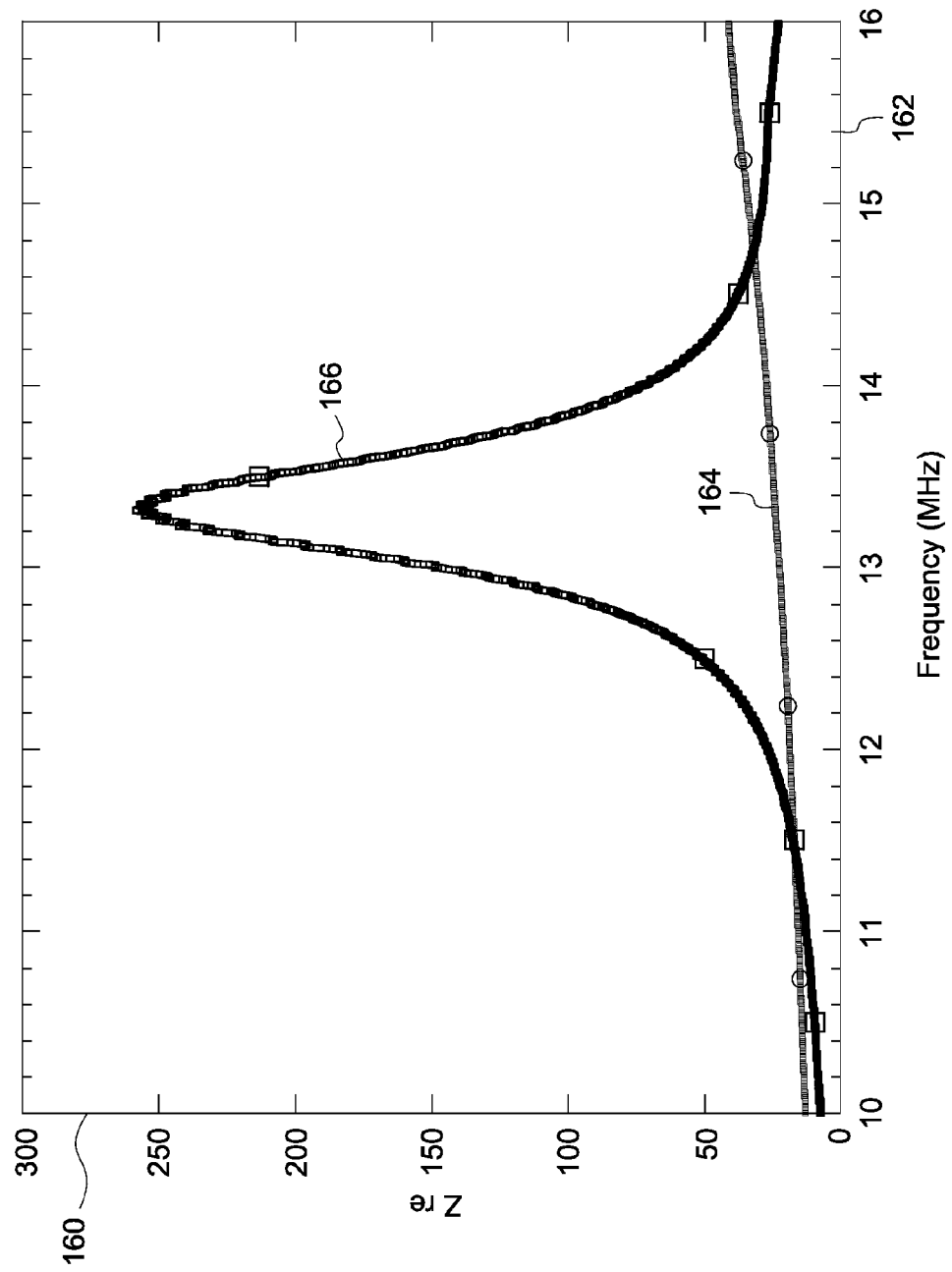
FIG. 9 is a graphical representation of an impedance response of sensing devices with and without a protection film.

FIG. 9 represents the change in impedance response of a conventional RFID sensor versus the sensing device of the present technique. The ordinate 160 represents real part of the complex impedance, and the abscissa 162 represents frequency. The impedance response interrogated via a network analyzer is illustrated by waveforms 164 and 166. As illustrated by the waveform 166, a strong response was obtained when a thin ferrite was employed to separate the radio frequency sensor circuitry from the metal surface. Whereas, as illustrated by the waveform 164, no response was observed when the ferrite film was not employed in the sensing device.

Example 2

In this example, the measurement system and data analysis were as described in Example 1. The multiplexer was used to measure responses from two RFID sensing devices at once. The two RFID sensing devices were attached with an adhesive tape to a plastic container that contained water. In this example, electrical conductivity of water changed from about 0.003 mS/cm to 183 mS/cm by adding NaCl salt to distilled water. One RFID sensing device had an aluminum foil and a protection ferrite film between the sensing device and container wall. One side of the aluminum foil was disposed on the wall of the container, a protection ferrite film was disposed on the other side of the aluminum foil, and a sensing film was disposed on the protection ferrite film. A pick up coil for reading the response of the sensing device was also provided.

Figure 10:
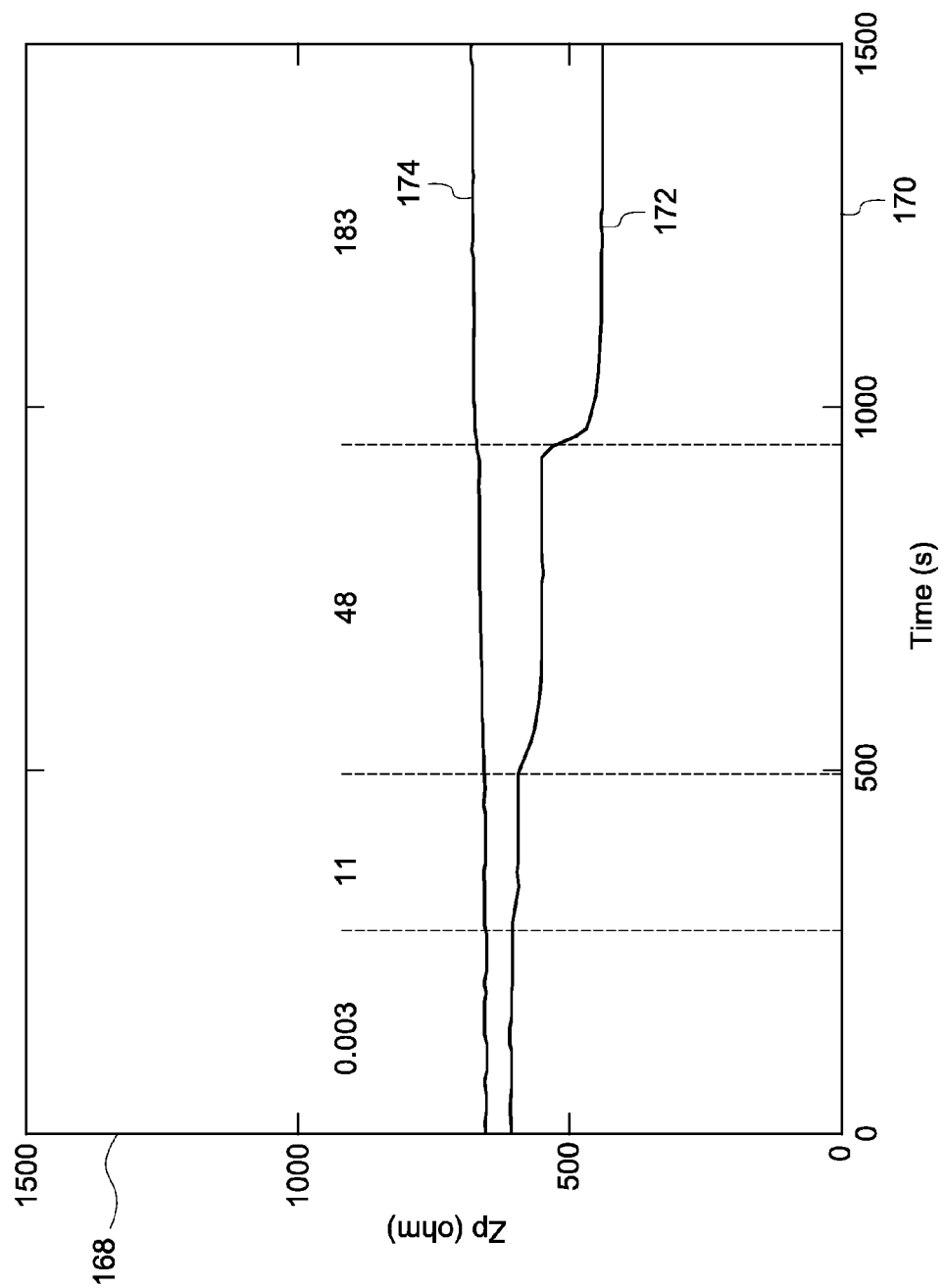
FIG. 10 is a graphical representation of a conductivity response of sensing devices with and without a protection film.

The second sensing device was directly attached to the container wall and the second pick up coil was used to read the response for the second sensing device. FIG. 10 is a graphical representation of an impedance response 168 with respect to time 170 of the sensing devices with and without a protection film. The graph 172 shows that with change in the electrical conductivity of water from 0.003 mS/cm to 183 mS/cm, the response of the second RFID sensing device, which was an unprotected RFID sensor, changes. Thus, the second sensing device operated as RFID water conductivity sensor. Whereas, the graph 174 shows that the response of the first sensing device, which was a protected RFID sensing device did not change with the change in the electrical conductivity of water from 0.003 mS/cm to 183 mS/cm. Thus, the first sensing device was unaffected to the changes in the conductivity of the water. Such a sensing device was further used for measurements of solution temperature as the temperature readings were not affected by the changes in the electrical conductivity of the water.

Example 3

Figure 11:
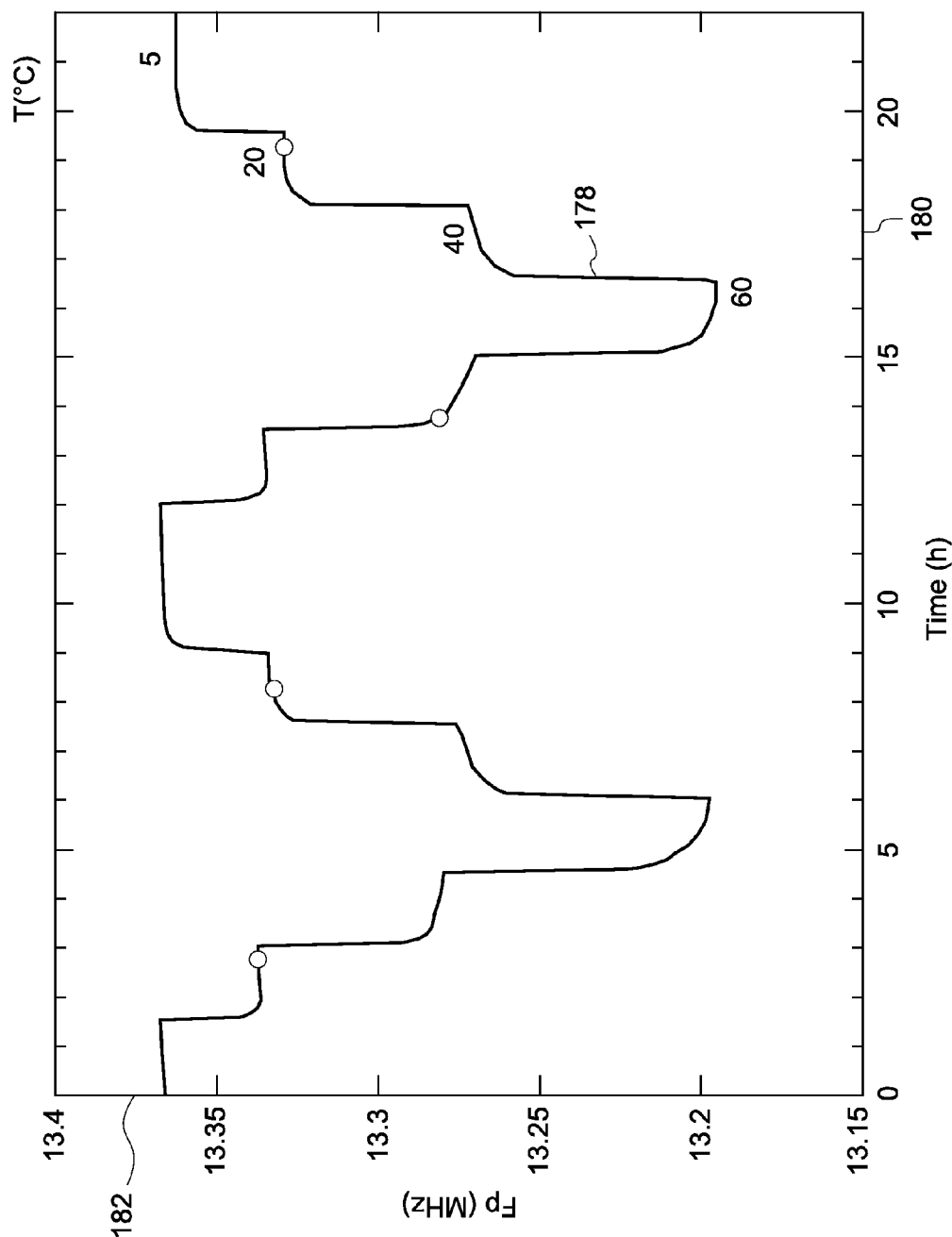
FIG. 11 is a graphical representation of a temperature response of a sensing device employed on a metal surface.

In this example, the measurement system and data analysis were as described in Example 1. An RFID sensing device with a protection ferrite film was positioned onto a surface of a metal container. The sensing device was used for measurements of temperature. FIG. 11 is a graphical representation of a response of RFID temperature sensing device operating on a metal surface. The graph 178 represents the change sensor frequency 182 as a function of experimental time 180.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sensing device adapted to detect environmental changes and/or an analyte, comprising:
   radio frequency sensor circuitry;
   a ferrite material disposed on the radio frequency sensor circuitry; and
   a metallic layer disposed on the ferrite material, wherein the metallic layer is an integral part to the sensing device.

2. The sensing device of claim 1, wherein the device is disposed on a non-metallic surface.

3. The sensing device of claim 1, wherein the radio frequency sensor circuitry is a radio frequency identification (RFID) tag.

4. The sensing device of claim 1, wherein the radio frequency sensor circuitry comprises one or more of an antenna, a capacitor, a memory chip, or combinations thereof.

5. The sensing device of claim 1, wherein the metallic layer is selectively porous to the analyte.

6. The sensing device of claim 1, wherein the metallic layer comprises a semiconductor material.

7. The sensing device of claim 6, wherein the metallic layer comprises a metal or a conjugated polymer.

8. The sensing device of claim 1, further comprising a sensing film disposed on the radio frequency sensor circuitry.

9. The sensing device of claim 8, wherein the sensing film comprises a chemical sensor, a biological sensor, a physical sensor or a radiological sensor.

10. The sensing device of claim 8, further comprising a front metallic layer, a front ferrite material, or both disposed on the sensing film.

11. The sensing device of claim 1, wherein the ferrite material is configured to act as a sensing film.

12. The sensing device of claim 1, wherein the ferrite material is dispersed in a substrate of the radio frequency sensor circuitry.

13. The sensing device of claim 1, wherein the environmental changes comprise one or more of a temperature change, a pressure change, a conductivity change, a chemical concentration change, a radioactive radiation change or a biological concentration change.

14. The sensing device of claim 1, further comprising one or more passivating layers disposed adjacent to the radio frequency sensor circuitry.

15. The device of claim 1, wherein the ferrite material comprises a ferromagnetic material having a permeability greater than 1.

16. The device of claim 15, wherein the ferromagnetic material is selected from the group consisting of nickel, zinc ferrite, carbonyl iron, magnetite, iron silicide, iron alloy, nickel alloy, and combinations thereof.

17. The device of claim 1, wherein the sensing device is configured to detect analytes in a liquid sample.

* * * * *